United States Patent

Wickramasinghe et al.

Patent Number: 5,623,339
Date of Patent: Apr. 22, 1997

[54] INTERFEROMETRIC MEASURING METHOD BASED ON MULTI-POLE SENSING

[75] Inventors: Hemantha K. Wickramasinghe, Chappaqua; Frederic Zenhausern, Mohegan Lake; Martin P. O'Boyle, Peekskill, all of N.Y.

[73] Assignee: International Business Machines Corporation, Armonk, N.Y.

[21] Appl. No.: 511,579

[22] Filed: Aug. 4, 1995

[51] Int. Cl.⁶ ............................................. G01B 9/02
[52] U.S. Cl. ............................................ 356/357; 250/307
[58] Field of Search ........................... 356/357; 250/306, 250/307, 309, 310, 234; 73/105; 324/96

[56] References Cited

U.S. PATENT DOCUMENTS 5,340,981   8/1994   De Fornel et al. .................. 356/234

OTHER PUBLICATIONS

F. Zenhausern, et al, "Apertureless near-field optical microscope", Appl. Phys. Lett. 65 (13) 26 Sep. 1994, pp. 1623–1625.

*Primary Examiner*—Samuel A. Turner
*Assistant Examiner*—Amanda Merlino
*Attorney, Agent, or Firm*—Stephen C. Kaufman

[57] ABSTRACT

A method for deriving physical properties of a workpiece. The method comprises the steps of sampling an electromagnetic wave packet representative of workpiece properties and comprising encoded scattered wave information derivable from a multi-pole interactive coupling between a probe tip and the workpiece; decoding said electromagnetic wave packet by interrogating at least one of its phase and amplitude information; and, correlating this information to referent physical-chemical properties of the workpiece.

14 Claims, 4 Drawing Sheets

INTERFEROMETRIC MEASURING METHOD BASED ON MULTI-POLE SENSING

CROSS-REFERENCE TO RELATED APPLICATIONS

Reference is made to commonly assigned U.S. patent application Ser. No. 08/511,166 entitled "An Interferemetric Detecting/Imaging Method Based On Multi-Pole Sensing", and to commonly assigned U.S. patent application Ser. No. 08/511,169 entitled "An Interferometric Near-Field Apparatus Based on Multi-Pole Sensing", which applications are filed on even date herewith and incorporated by reference herein.

FIELD OF THE INVENTION

This invention relates to a novel method for deriving physical properties of a workpiece, the method preferably realizable by way of an interferometric near field microscope.

INTRODUCTION TO THE INVENTION

We are investigating methods suitable for deriving or determining physical properties of a workpiece.

By the phrase "a workpiece", we mean, preferably, materials that may be variously characterized as organic compounds, conductors, semiconductors, insulators, ferromagnetics, paramagnetics, diamagnetics or composites thereof.

By the phrase "determining physical properties of a workpiece", we reference the following concepts.

It is known that there can be many different kinds of interaction between electromagnetic radiation and a workpiece. For example, some common interactions include refraction, reflection or absorption. For a specific workpiece, these phenomena are usually described quantitatively in terms of phenomenological parameters empirically assigned to the workpiece: e.g., index of refraction, and absorption index.

Further, by considering the properties of electromagnetic waves, one can, for example, correlate the index of refraction with the possibility of polarizing a material (i.e., separating positive and negative charges) as expressed by a dielectric constant of the workpiece; magnetize a workpiece (i.e., line up magnetic dipoles) as expressed by the permeability of the workpiece; or, correlate a particular kind of optical absorption with the electrical conductivity of the workpiece.

In sum, accordingly, by the phrase "determining physical properties of a workpiece", we reference methods for determining phenomenological properties of a workpiece including, inter alia, polarization, magnetic or dielectric susceptibility, or dielectric constant of the workpiece.

SUMMARY OF THE INVENTION

Classical analytical techniques suitable for determining physical properties of a workpiece, even at the molecular level, are known, and include e.g., scanning microscopies, acoustic imaging, x-ray analysis or electron imaging. Implicit in these known classical techniques, however, are several subsumed measurement assumptions or requirements: for example, that an average measurement is based on a workpiece that comprises an initial mass of at least several molecules; or, a measurement, particularly in obtaining optical information, is delimited in the sense that the resolution capabilities of classical optical techniques i.e., confocal, fluorescent and polarized light microscopies, are diffraction limited and the sensitivity can not reach single atom detection.

We note that most of these analytical techniques, in particular, Near Field Scanning Optical Microscopy, NSOM, are based on fluorescence detection, whose signal detection may be limited by a molecular detection efficiency corresponding to the fraction of molecules in the sample that can actually be detected.

There are several important limitations on the magnitude of a signal that can ultimately be obtained from a single-molecule. A finite fluorescence lifetime and photobleaching, combined with typical photon detection efficiency, yield typically a maximum of a few thousand detectable fluorescent photons. Molecular detection probabilities (and concentration detection limits) are strongly influenced by the background (for example, Raman and Raleigh scattering from contaminants or solvents, laser intensity inhomogeneity . . . ) and signal photocount amplitude probability distributions, as well as the average S/N. The response to one or several molecules in a given probe volume is clearly highly dependent on photocount statistics, just as the molecular detection efficiency. Complications such as excitation laser noise, molecular diffusion and other processes (e.g., incomplete photobleaching) can also obscure a distinction between one or two molecules.

In current experimental setups, the instrument components are chosen to minimize the background signals (for example, small illumination volume) and to maximize the light collection efficiency (for example, high numerical aperture objectives). Typically, the best current NSOM configurations allow a spatial location of $\lambda/10$, limiting efficient discrimination among different molecules.

The last decade has seen relevant applications in modern imaging techniques mainly due to improvements in optics, instrumentation and contrast enhancement techniques. There has been a rapid growth in microscale imaging, spectroscopic measurements to the nanometric scale, and microfabrication. Scanning probe microscopy is increasingly being applied in materials science, chemical and biological surface applications, due to its nondestructive nature, and capabilities for use in fluids. Typical examples of scanning probe microscopes include Scanning Tunneling Microscopes (STM), Atomic Force Microscopes (AFM) and all derivatives, for example, the Magnetic Force Microscope (MFM) or the Thermal Probe Microscope.

More recently, advances in the optics of nanometer dimensions have occurred, particularly with increasing emphasis on scanning near-field optical microscopy (NSOM). Typically, the influence of a local probe near an interface can result in variations of the distribution of electromagnetic fields. There are various configurations (reflection and transmission modes) of these near-field sensing techniques, exploiting radiation effects based on far-field detection of optical interactions between probe and workpiece.

Among various NSOM optical sensors, spherical particles, and pointed tips may be used to perturb an incident radiation, e.g., an evanescent wave. The probe sensor can create a field distribution which may be detected in the far-field, carrying information on the near-field zone surrounding the probe source and characteristic of its optical properties. In many of the experimental NSOM setups, an optical scanning sensor incorporates a small aperture (see description of aperture-based system as NSOM probes in U.S. Pat. Nos. 4,917,462; 5,272,330) from which a local excitation electric field distribution can emerge for transversally illuminating the workpiece. As a result, near-field distortions due to the interaction between the aperture acting as a weak light source (e.g., low efficiency of about 50 nW for 80 nm aperture) and the workpiece are similarly detected in the far-field by measuring the intensity only of the radiation (i.e., the square of the electric field in place of a direct measurement of the electric field as described in the present invention) with the use of a photon counter device.

Our work is cognizant of the significance and importance of methods and instrumentation suitable for determining physical properties of a workpiece. In particular, we build on the classical analytical techniques and challenge extant assumptions or requirements, to thereby qualitatively extend and redefine them.

The present invention can provide a significant extension in spatial resolution to at least $\lambda/500$ and even down to the atomic level, thereby providing an ability for lower concentration detection limits, for example, below the femtomolar level. In addition to being highly sensitive, the present interferometric imaging/sampling method, based on sensing a multi-pole coupling between a probe and a workpiece through amplitude and/or phase detection, permits one to process complex susceptibility measurements or the complete excitation spectrum of a single-molecule. In particular, a coupling interaction comprises a complex function including a resistive or imaginary component and a reactive or real component (inductive or capacitive) that can be measured down to the atomic level. Moreover, a unique ability of excitation spectroscopy combined with background minimization, through interferometric coherent detection, can overcome several intrinsic limitations of fluorescent based techniques for single-molecular detection.

The present invention describes a method in which an electromagnetic radiation interaction between a probe dipole and a workpiece dipole externally driven by an incident field, e.g., an evanescent or propagating or standing field, can be detected by interferometrically measuring amplitude and phase differences between a reflected wave and a reference wave component. The dipole-dipole coupling mechanism comprises a main source of contrast generation, and the near field interferometric detection of the scattered optical power can achieve ultimate S/N and resolution due to a $(ka)^3$ signal dependence, rather than $(ka)^6$ in conventional NSOMs.

The following theoretical part of this disclosure demonstrates how physical and chemical information, preferably optical-spectroscopic information, about the source probe and workpiece, can be obtained down to the atomic level. As the near-field zone surrounding the probe is characteristic for its dielectric/magnetic properties, and as the probe volume can have atomic dimensions, it becomes clear that this method can provide specific information and/or images never before realizable.

We now disclose a novel method suitable for deriving physical properties of a workpiece, the method comprising the steps of:

1) sampling an electromagnetic wave packet representative of workpiece properties and comprising encoded wave information derivable from a multi-pole interactive coupling between a probe tip and the workpiece;

2) decoding said electromagnetic wave packet by interrogating at least one of its phase and amplitude information; and 3) correlating this information to referent physical chemical properties of the workpiece.

The novel method as defined can realize important advantages. Its enablement allows one to measure sundry workpiece properties, for example, its complex susceptibility with a very high spatial resolution down to atomic dimensions.

A preferred realization of the novel method is disclosed below, and features utilization of an interferometric near field apparatus providing super-resolution e.g., 1 nanometer resolution, thereby enabling resolution of a workpiece close to the atomic level.

BRIEF DESCRIPTION OF THE DRAWINGS

The invention is illustrated in the accompanying drawing, (not drawn to scale), in which.

DETAILED DESCRIPTION OF THE INVENTION

We develop the detailed description by first disclosing an interferometric near-field apparatus that is preferably employed in realization of the novel method of the present invention. To this end, attention is directed to FIG. 1, which shows in overview such a generalized apparatus operating in a transmission mode.

Figure 1:
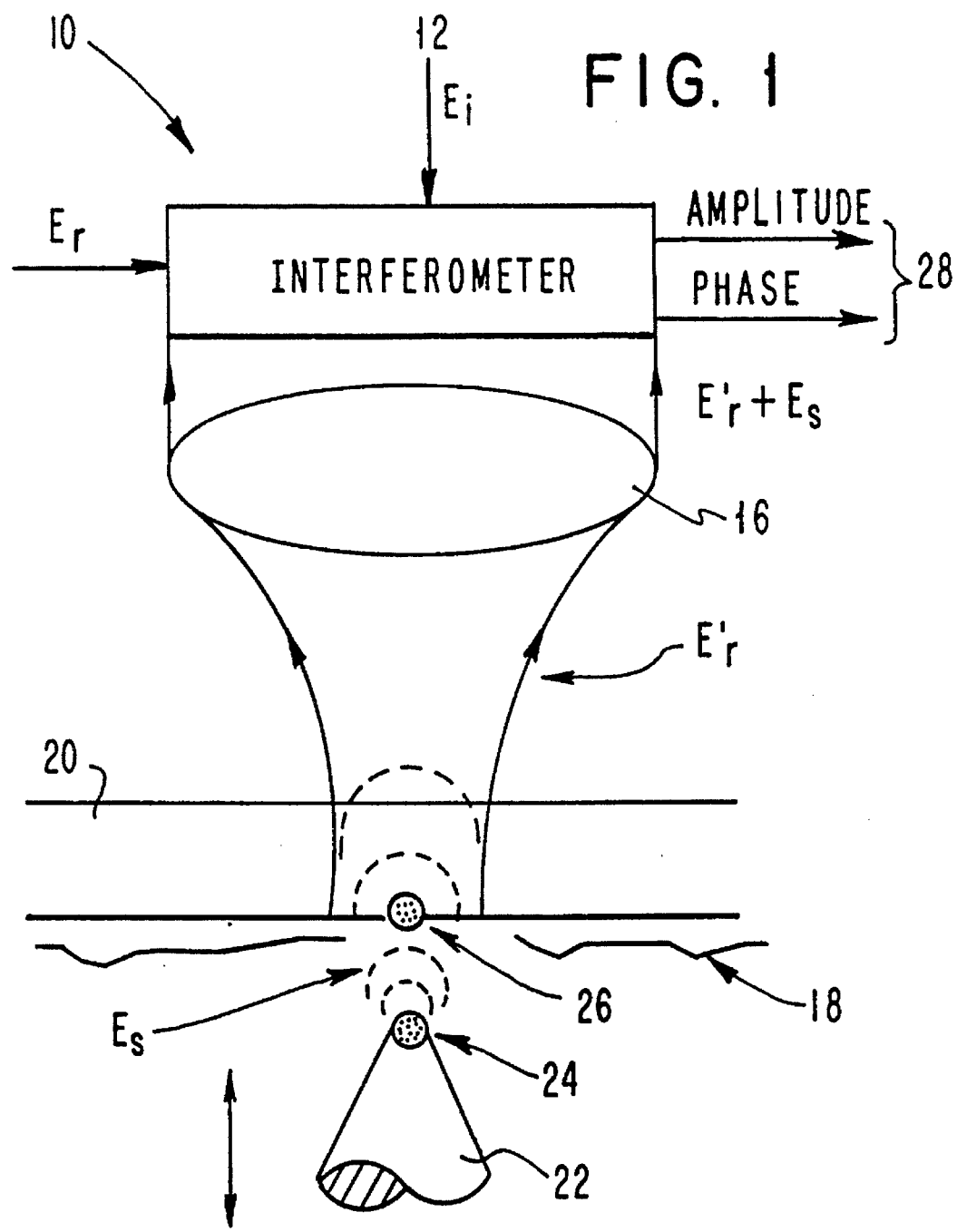
FIGS. 1, 2 show in overview a principle of interferometric measurement using an apparatus comprising multi-pole interactive coupling.

The FIG. 1 apparatus 10 comprises a source 12 of electromagnetic radiation, preferably generating an incident electric field $E_i$, preferably in the optical spectrum, for example from UV to IR. The electric field $E_i$ is directed through a conventional interferometer 14 to a focusing element 16 which preferably comprises an aperture or an objective lens. The interferometer 14 may comprise e.g., a Michelson, Fabry-Perot or Twyman-Green apparatus. The driving electric field $E_i$ is now focused on a workpiece 18, in turn supported by a transparent substrate 20. (Note that in an alternative embodiment shown in FIG. 2 comprising a reflection mode, the driving electric field $E_i$ is focused directly on the workpiece 18).

FIG. 1 also shows a probe tip sensor 22 preferably placed with respect to the workpiece 18 such that a distance between the probe tip 22 and at least a portion of the workpiece 18 surface is smaller than the source 12 radiation wavelength, or a multiple of it.

Note that a suitable probe may comprise a sharp metallic tip or an uncoated silicon and/or silicon nitride tip, or a tip coated with a conductive layer or a molecular system. The probe preferably comprises a high refractive index material. A near-field probe capability may be realized by e.g., a scanning tunneling microscope (STM), an atomic force microscope (AFM), an aperture or apertureless near-field optical microscope, a near-field acoustic microscope, a thermal microscope or a magnetic force microscope (MFM). A notion of "scanning" references the fact that probe and workpiece may be in relative motion. Reference may be made for example to U.S. Pat. Nos. 5,319,977; 4,343,993; 5,003,815; 4,941,753; 4,947,034; 4,747,698 and Appl. Phys.

Lett. 65(13), 26 Sep. 1994. The disclosures of each of these patents and publications are incorporated herein by reference.

The FIG. 1 probe tip 22 is capable of re-radiating, in the form of a signal beam -SIG- $(E_s+E'_r)$, an incident radiation beam, the signal beam comprising carrier beam $E'_r$ combined with workpiece 18 property information encoded in the scattered field $E_s$ as the tip-feature dipole-dipole coupling. The signal beam -SIG- comprises a scattered electromagnetic field variation wave $E_s$, due preferably to the probe 22 vibrating (or moving relatively) in close proximity to the workpiece 18 surface. Note that the FIG. 1 signal beam SIG illustrates what is summarized above as an electromagnetic wave packet representative of workpiece properties and comprising encoded wave information derivable from a multi-pole interactive coupling between probe and workpiece. In particular, the incident radiation $E_i$ can drive this action such that a dipole 24 dipole 26 coupling interaction is created between tip dipole 24 and workpiece dipole 26.

FIG. 1 further shows that the aperture 16 helps for creating an interference signal -IS- based on the signal beam $(E_s+E'_r)$ and a reference beam $(E_r)$, and for directing the interference signal through the interferometer 14. The output signal 28 of the interferometer 14 can measure either the amplitude of $(E_s+E'_r)$ or its phase difference with a reference beam $E_r$. Note that a self-interference phenomena can be alternatively exploited and comprises spatially separating the beam 12 in several components having phase differences that are subsequently made to interfere.

Figure 2:
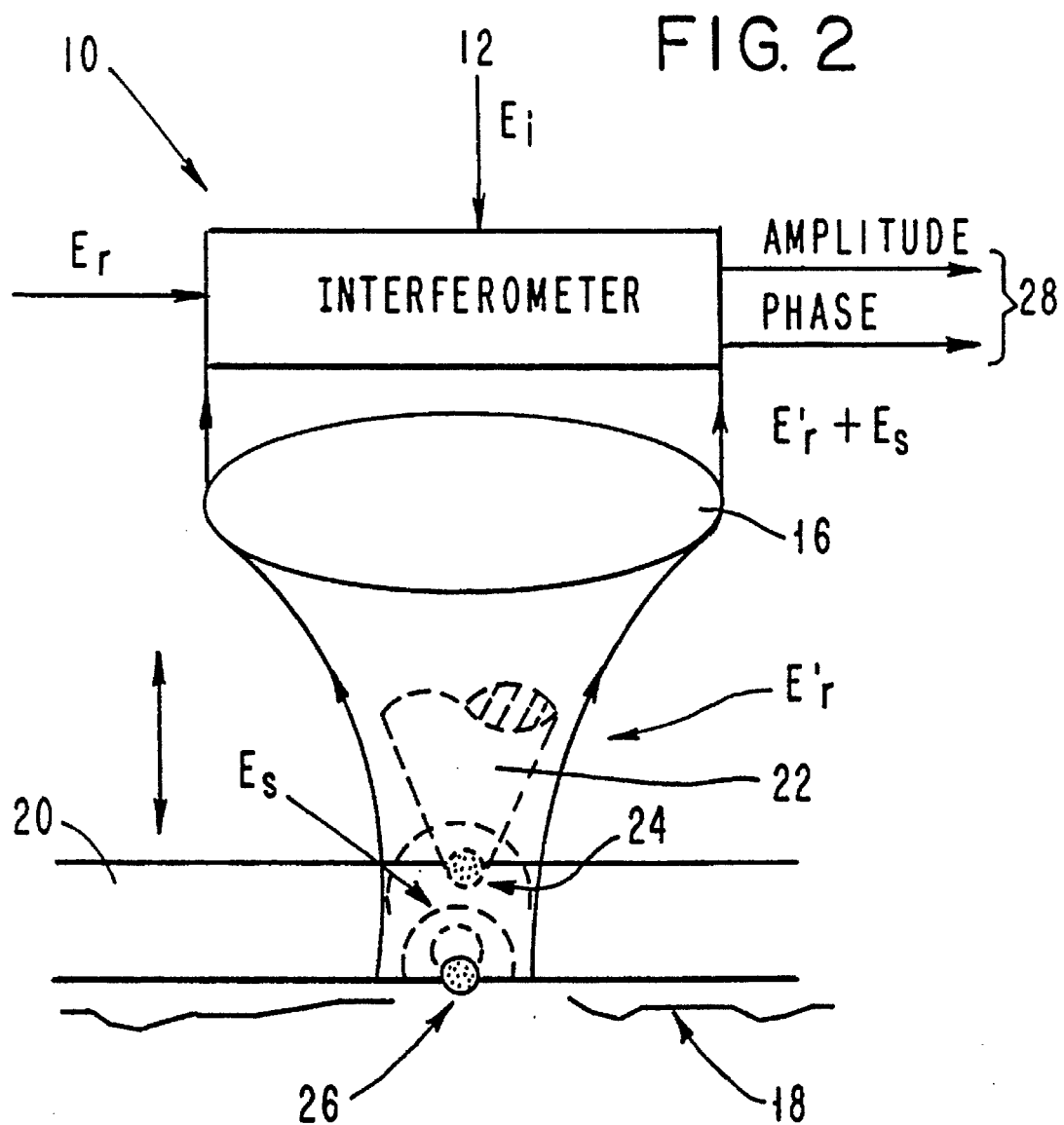

As alluded to above, FIG. 2 shows the FIG. 1 apparatus, but modified for utilization in a reflection mode. One difference in the change of mode is that in the reflection mode, the substrate 20 does not need to be transparent: the apparatus of FIG. 2, otherwise, may be realized mutatis mutandis visa vis the apparatus of FIG. 1.

As illustrated in the fundamental FIG. 1, it should be noted that the incident light can be directed to a near-field probe either through the workpiece (transmission mode) or by reflection at its surface. In this latter case, particular attention has to be taken to discriminate the probe signal against spurious reflected light. For the sake of simplicity, only a transmission case is described below.

Figure 3:
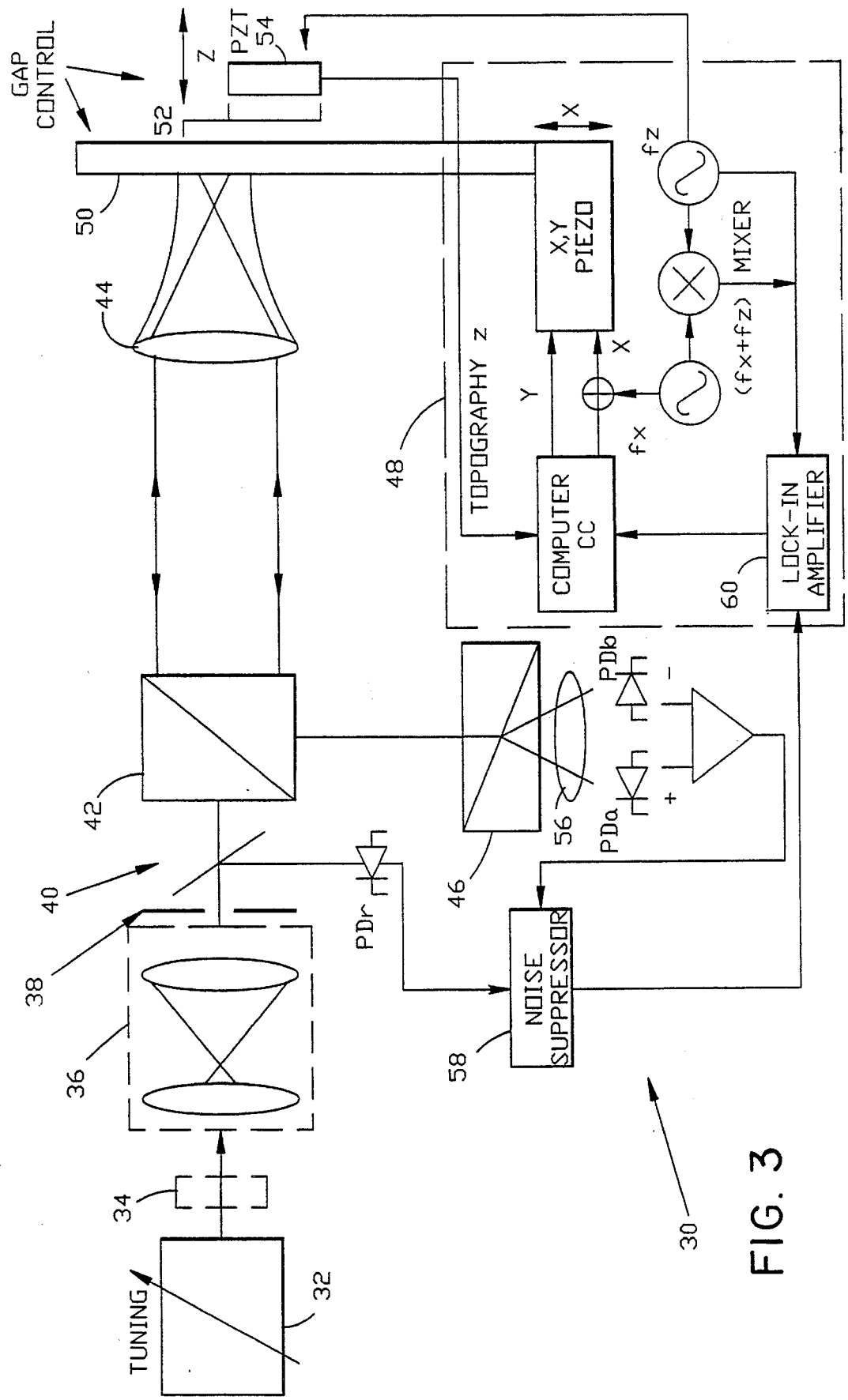
FIG. 3, provide a schematic for explaining basic concepts about a preferred interferometric near-field apertureless microscope operating in a transmission mode.

Attention is now directed to FIG. 3, which shows details of a preferred apparatus 30 for the realization of the present method and which are consistent with the generalized FIGS. 1,2 apparatus 10.

The FIG. 3 apparatus 30 comprises an interferometer and includes the following components: an electromagnetic source, preferably a tunable wavelength (e.g., 400 nm<$\lambda$<2500 nm) laser 32, an optional acousto-optic modulator 34 in order to prevent spurious back reflection of light generating laser noise; a special beam expander 36 for relative beam and measurement area movement; an aperture 38; a means for splitting an incoming lightwave into first and second lightwaves comprising a pellicule beam splitter 40; a polarising beam splitter 42; a transmission/collection optics (preferably a Nomarski Oil/dark-field objective) 44; a Wollaston prism 46; and, 3 photodetectors $PD_n$. FIG. 3 shows in association with the interferometer an optical probe sensor and a set of electronics 48 (enclosed by the broken-border box in FIG. 3) that permits both topographic measurements and probe-workpiece distance feedback regulation with at least nanometer accuracy. Preferably using an AFM feedback, one can therefore image a surface topography while simultaneously recording a near-field optical image.

In the FIG. 3 illumination pathway, the laser beam of appropriate polarisation first passes through the beam steering unit 36 in order to expand the beam size in accordance with the objective aperture 44. The laser beam can be adjusted continuously within the beam steering unit 36 by preferably using a piezoelectric positioning system (e.g., x-y-z PZT tube) allowing small motion with nanometer accuracy. The beam steering is also controlled by an image-collection electronics 48 for relatively positioning the focused spots, a measurement area of the workpiece 50 and an optical probe sensor 52 while the scanned beam is traced back and forth.

The expanded laser light passes through the aperture 38 (preferably matching geometries of the transmission/collection optics 44) in which an angular discrimination of the incident radiation distribution preferably selects a total internal reflection illumination. Typically, the pellicle beam splitter 40 reflects about 10% of the incident radiation to a reference arm of the interferometer 30 to a detector, preferably a photodiode $PD_R$ and transmits about 90% of the incident radiation to the polarising beamsplitter 42.

The beam preferably is imaged to a plane wave that overfills the back aperture of the Nomarski objective 44 which focuses the plane wave to two diffraction limited spots in the workpiece 50. Because the aperture 38 blanks the illumination near the center of the beam, the exciting light wave propagates as an evanescent wave in the area illuminated in the workpiece.

When a probe sensor 52 that can operate various motions relative to the workpiece 50 at different frequencies (e.g., resonance frequency) with the help of a three-coordinate piezoelectric translator 54, is approached typically a few nanometers close to the workpiece 50, the probe 52 is capable of locally perturbing the wave impinging the smallest spatial asperity (e.g., the very end of a pointed STM or AFM tip) of the probe 52 resulting in a coupling mechanism between the probe dipole and feature dipole of the workpiece.

In terms of an electromagnetic field distribution, the scattered electric field variation due to the vibrating and scanning probe tip 52 in close proximity to the workpiece 50, may be measured by encoding it as a modulation in the phase of a second arm of the interferometer 30.

Figure 4:
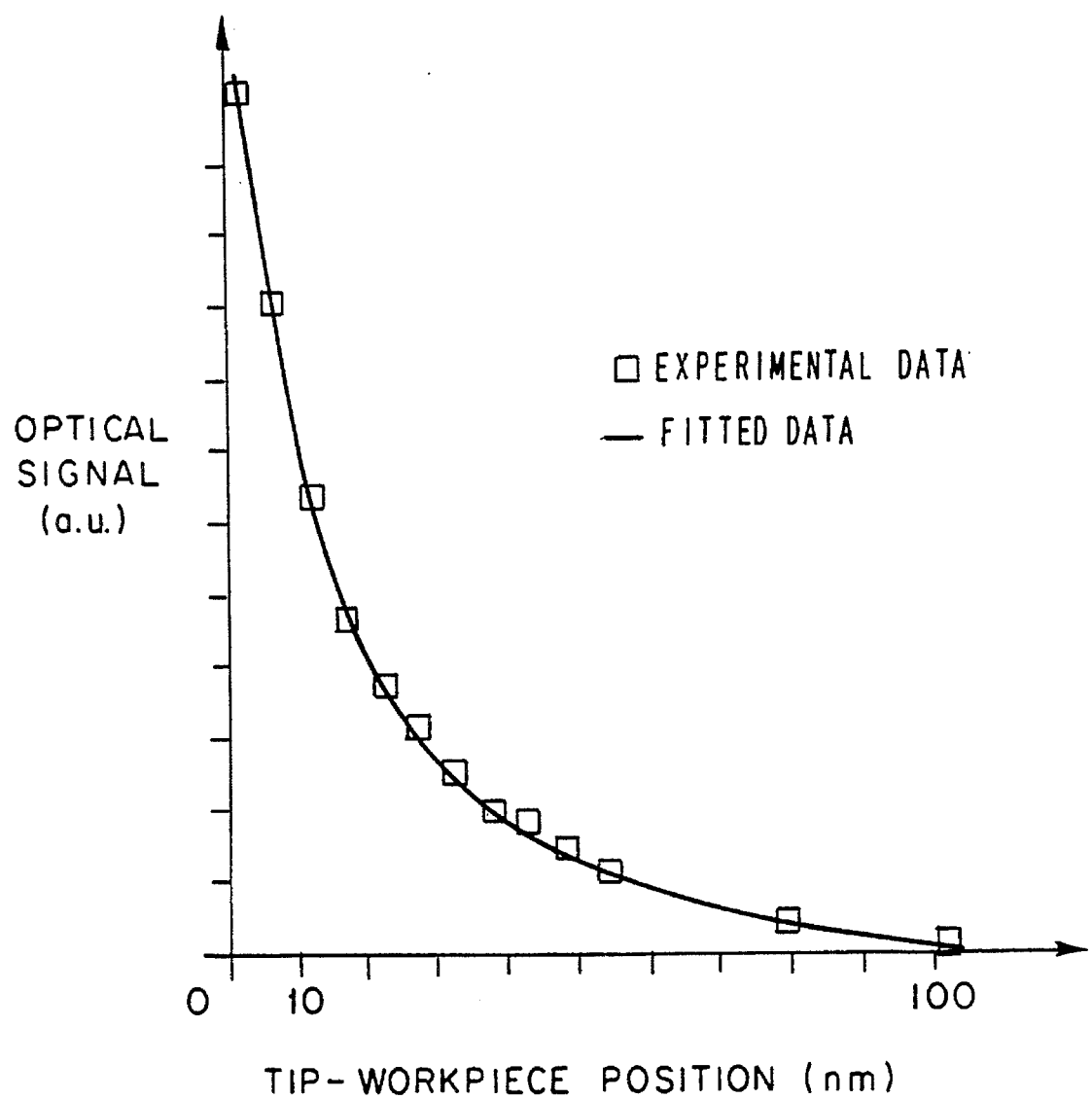
FIG. 4 illustrates measured optical dipole coupling vs. probe workpiece spacing, compared with theory.

As it is shown in FIG. 4, the optical signal strongly depends on the distance of the probe 52 dipole from the workpiece 50 dipole. The optical signal is collected by the objective 44 and reflected through the polarising beamsplitter 42 to a Wollaston prism 46 with its axis oriented relative to the Nomarski prism, in order to optimize the interference of the reflected electric fields from the two spots, and to measure the phase of the signal beam $(E_s+E'_r)$ which corresponds to the real part of the scattered wave $E_s$.

The light continues through an external lens 56 that focuses the light onto a photodiode $PD_A$ and $PD_B$. The imaginary part of the scattered wave $E_s$ can be detected by orienting the Wollaston prism 46 axis to be aligned with the Nomarski prism 44 axis, so as to separately detect the optical powers in the two spots (without mixing) in the differential photodiode $PD_{A-B}$. This detection arrangement preferably operates at pre-selected frequencies ranging from 100 Hz to 100 MHz.

The output signal of this differential detector preferably is sent to a noise suppressor 58 for further noise improvement, by combining the photocurrent from $PD_{A-B}$ with that from the reference photodetector $PD_R$ which is fed a sample of the incident beam. The noise suppressor output preferably is sent to a lock-in amplifier input 60 in order to demodulate the resultant near-field AC signal carrying interesting information about workpiece properties. The output of 60 can be sent to a controller/computer -CC- device for generating an optical image that can be preferably compared simultaneously with an attractive mode AFM image generated by the independent feedback loop system 48.

The scattered field $E_s$ from the probe tip 52 end will in general be present on top of a spurious background of light scattered from the tip shank. The background signal can preferably be reduced in these ways. First, we use a confocal arrangement for optical illumination and detection; this restricts the detection region to within 100 nm of the tip end. Second, if the tip is modulated in z at frequency $f_z$ by an amplitude which is approximately the tip radius, the back-scattered light from the tip end will have a larger modulation on the workpiece as compared with light scattered from regions that are farther away as the tip is approached very close to the workpiece. Finally, one can further enhance the signals at the spatial frequencies of interest (i.e., corresponding to the radius of the probe tip) by vibrating the workpiece laterally by approximately the tip radius at frequency $f_x$ and detecting the interferometer signal at the sum frequency $(f_x+f_z)$ as it is illustrated by the broken line in the FIG. 3 box 48.

As articulated above, we have developed the detailed description of the novel method of the present invention by first disclosing preferred interferometric near field apparatus (FIGS. 1–3). Utilization of such apparatus can yield information about workpiece properties. We now turn our attention to how this information can be abstracted in an intelligible manner, to thereby actualize the steps of the novel method.

Since the optical dipole interaction varies as $r^{-3}$, a measured signal primarily derives from the tip end. One can therefore assume that the tip can be modeled as a sphere of radius a, and polarizability $\alpha_t$ and that the feature that is being imaged on the workpiece has a polarizability $\alpha_f$ and radius a (although the theory could easily be generalized for any arbitrary feature size). If the tip and workpiece are immersed in a driving electric field $E_i$ (caused by the incident radiation), and $\epsilon$ is the dielectric permittivity of the surrounding medium, the following coupled equations for the induced dipole moments $P_t$ and $P_f$ in the tip and feature respectively (FIG. 1) can be written as:

$$P_t = \alpha_t \epsilon (E_i + E_f) \quad (1)$$

$$P_f = \alpha_f \epsilon (E_i + E_t) \quad (2)$$

Here, $E_t$ and $E_f$ are the corresponding near-fields generated by the dipole moments of tip and feature respectively. For the case where the spacing r between tip and feature is greater than the diameter $2a$, the dipole approximation can be used and the following expressions for $E_t$ and $E_f$ can be written:

$$E_t = -\frac{P_t}{\epsilon r^3} \quad (3)$$

$$E_f = -\frac{P_f}{\epsilon r^3} \quad (4)$$

Substituting for $E_t$ and $E_f$ in equations (1) and (2) and solving for $P_t$ and $P_f$ it is found, after eliminating terms of order less than $r^{-3}$, that:

$$P_t = \alpha_t \epsilon \left(1 - \frac{\alpha_f}{r^3}\right) E_i \quad (5)$$

$$P_f = \alpha_f \epsilon \left(1 - \frac{\alpha_t}{r^3}\right) E_i \quad (6)$$

Equations (5) and (6) show very clearly how the tip polarization couples with the feature polarization to generate a polarization modulation term $$\Delta P = \frac{2\alpha_t \alpha_f \epsilon E_i}{r^3} .$$

It is this polarization modulation that produces a modulation in the scattered electric field $E_s$ as the tip—feature spacing r is modulated by vibrating the tip. As mentioned earlier, equations (5) and (6) are derived for the case where r>2a the linear dimension of the dipole (for a sphere, this linear dimension is comparable to its diameter). The corresponding equations for arbitrary r can be obtained using quasi-static theory simply by changing r to $$(r^2 + a^2)^{\frac{3}{2}}$$

in equations (5) and (6). More general expressions for the polarization modulation $\Delta P$ and the polarizability modulation $\Delta \alpha$ are thus:

$$\Delta P = \frac{2\alpha_t \alpha_f \epsilon E_i}{(r^2 + a^2)^{\frac{3}{2}}} \quad (7)$$

$$\Delta \alpha = \frac{2\alpha_t \alpha_f}{(r^2 + a^2)^{\frac{3}{2}}} \quad (8)$$

From equations (7) and (8), $\Delta P$ and $\Delta \alpha$ decreases rapidly from their maximum values as the tip-feature spacing is increased $$\left(\sim \frac{1}{r^3}\right).$$

As it will be described later for situations where $$ka << 1, \left( k = 2\pi \frac{n}{\lambda} \right.$$

being the optical propagation constant in a medium of refractive index n) the scattered electric field modulation $\Delta E_s$ is directly proportional to $\Delta \alpha$; one can therefore expect to see a strong decrease in $\Delta E_s$ as the tip-feature dipole-dipole coupling decreases with increasing r. As shown in FIG. 4, experiments show a rapid variation over tip-workpiece spacings comparable to the tip radius. Furthermore, equations (7) and (8) show that $\Delta P$ and $\Delta \alpha$ are proportional to the product of the complex polarizability of the tip $\alpha_t$ and that of the feature $\alpha_f$. Consequently, the phase of the scattered field component $\Delta E_s$ can change drastically depending on the complex polarizability of the tip-end as previously observed (FIG. 4).

Now, the modulation $\Delta E_s$ of the scattered field $E_s$ caused by the polarizability modulation $\Delta \alpha$ can be calculated by applying the scattering matrix treatment used by van de Hulst (Light Scattering by Small Particles, Wiley, New-York 1957) to study light scattering from small particles. For an incident field $E_i$, the spherically scattered wave has electric field $E_s$ at a distance d in the far field given by $$E_s = \frac{E_i}{ikd} (S); \Delta E_s = \frac{E_i}{ikd} (\Delta S) \tag{9}$$

where the relevant scattering matrix component S (which has both real and imaginary components) can be written in terms of the polarizability $\alpha$:

$$S = ik^3\alpha + \frac{2}{3} k^6\alpha^2; \Delta S = ik^3\Delta\alpha + \frac{2}{3} K^6(\Delta\alpha)^2 \tag{10}$$

and for a simple sphere of radius a, and complex refractive index m (relative to the surrounding medium)

$$\alpha = a^3 \frac{(m^2 - 1)}{(m^2 + 2)} \tag{11}$$

Note that imaginary terms of order $k^5$ and higher order terms in the expansion for S have been omitted as we are dealing with scattering from very small particles (i.e., $ka \ll 1$).

As just shown, the reflected wave from the back surface of the workpiece 50 is a concentric spherical wave of amplitude $$E_r' = \left( \frac{E_i}{5} \right) (\omega_0) \frac{n}{dNA}, \text{ where } \omega_0 = \frac{\lambda}{\pi NA},$$

is the optical spot radius and NA is the numerical aperture of the objective lens. The expected phase difference $\Delta\phi$ between reference and signal beams is then $E_s/E_r$ or $\Delta\phi = 5k^3\alpha N A^2/8\pi$. The reflected wave is phase advanced by $\pi/2$ with respect to the scattered wave. Thus from equations (9) and (10) the imaginary component of S will give rise to a scattered field $E_{s\phi}$ that is $\pi/2$ phase delayed with respect to $E'_r$ generating an overall phase shift, and the real component of S will give rise to a small scattered field $E_{se}$ that is $\pi$ out of phase with respect to $E'_r$ generating an overall extinction.

Let us first consider the case where $\alpha$ is purely real (i.e., m is real (silicon) or m is imaginary (gold)). The z-vibrating probe tip produces a modulation $\Delta S$, $\Delta E_{s\phi}$ and $\Delta E_{se}$ respectively. $\Delta E_{se}$ interferes destructively with $E'_r$ to produce a fractional extinction $$\Delta \frac{p_e}{p}$$

of the reflected power in the spherical wave $E'_r$. Using equation (9) and the expression for $E'_r$ it becomes:

$$\Delta \frac{p_e}{p} = 2 \frac{\Delta E_{se}}{E_r'} = 5 \frac{NA^2}{n^2} Re[\Delta S] \tag{12}$$

From the second term in equation (10) Re[S] (and Re[$\Delta S$]) vary as $(ka)^6$ and $$\Delta \frac{p_e}{p}$$

will yield a negligibly small signal as the probe size decreases substantially below 50 nm. This term is in fact the fractional power scattered by the particle—i.e., what is typically detected in NSOM's.

By contrast, in an interferometric system $\Delta E_{s\phi}$ gives rise to a phase shift $$\Delta\phi = \Delta \frac{E_{s\phi}}{E_r'}$$

in the reflected beam. This phase change $\Delta\phi$ produces a fractional power change $$\Delta \frac{p\phi}{p}$$

of $2\Delta\phi$ at the photodiode (title to the differential phase detection system).

$$\frac{\Delta p_\phi}{p} = 2 \frac{\Delta E_{s\phi}}{E_r'} = 5 \frac{NA^2}{n^2} Im[\Delta S] \tag{13}$$

Therefore from equation (10), this fractional power change varies only as $(ka)^3$. It is this dependence that gives reasonable S/N ratios at sub-molecular resolution in the present method and eventually, the possibility to achieve atomic resolution.

One can estimate the ultimate resolution that may be achieved with the FIG. 3 apparatus using some simple considerations. Taking a silicon or metal tip (i.e. $m^{21}$) of radius a and polarisability $\alpha$, we have, $$\Delta\phi \approx \frac{5}{2} k^3 a^3 NA^2.$$

For a coherent, shot noise limited phase detection system with 1 mW laser power, we can show that $$\Delta \phi_{min} \approx 10^{-8} rad/\sqrt{Hz}.$$

This would suggest that for He-Ne laser light ($\lambda=633$ nm) with NA=0.85, a $\cong 1.7$ angstroms, i.e., the resolution should reach the atomic level.

Now consider the general case where m is complex, $\alpha$ is complex. Returning to equation (10) and neglecting the second term, (as we are only concerned with resolving features substantially below 50 nm), S will have both a real and imaginary part that produce scattered fields E, that vary as $(ka)^3$. Note that whereas in a dark-field measurement (like typical NSOM's), one will again be measuring scattered fractional powers that vary as $(ka)^6$, in SIAM, the imaginary part of $\alpha$ will produce a fractional power change that varies as $(ka)^3$ as it is evident from equation (12); these power changes can be detected by orienting the Wollaston prism axis to be aligned with the Nomarski prism axis, so as to separately detect the optical powers in the two spots (without mixing) in the differential photodiode. Other work on light scattering from plasmon resonances in spheres and more recently from STM tips are based on dark-field detection of the scattered optical power—i.e. $(ka)^6$—signal dependence—and as before run into severe S/N problems at resolutions below 50 nm. However, the use of an interferometric system, as reported herein, demonstrates the ability to achieve the ultimate S/N and resolution.

Combining equations (12) and (13) with equations (8) and (9) and noting that the polarizability is related to the susceptibility $\chi$ by $$\alpha = \frac{\chi}{4\pi} \left( \frac{4}{3} \pi a^3 \right),$$

equations (12) and (13) can be written in terms of the susceptibilities $\chi_t$ and $\chi_f$ of tip and feature respectively:

$$\Delta \frac{p_e}{p} = \frac{10}{9} (ka)^3 \frac{NA^2}{n^2} Im[\chi_t \chi_f] \tag{14}$$

$$\Delta \frac{p_\phi}{p} = \frac{10}{9} (ka)^3 \frac{NA^2}{n^2} Re[\chi_t \chi_f] \tag{15}$$

Therefore, both the real and imaginary parts of the susceptibility of a feature can be determined—in principle down to the atomic scale—with two simultaneous measurements; the tip susceptibility being measured independently using a known reference surface as the workpiece.

Note, in conclusion, that the disclosure corresponding to equations (1–15) can be developed, mutatis mutandis, for a case herein an external driving field comprises a magnetic field and induces magnetic dipole-dipole coupling, and for a case wherein an external driving electromagnetic field comprises both appreciable electrical and magnetic field components for inducing electromagnetic dipole-dipole coupling.

We claim:

1. A method for deriving physical properties of a workpiece, the method comprising the steps of:

1) sampling an electromagnetic wave packet representative of workpiece properties and comprising encoded wave information derivable from a multi-pole interactive coupling between a probe and the workpiece;

2) decoding said electromagnetic wave packet by interrogating at least one of its phase and amplitude information using an interference reference wave; and 3) correlating this information to referent physical-chemical properties of the workpiece.

2. A method according to claim 1, wherein step (1) sampling comprises creating an interference effect between an incoming electromagnetic wave generated by a source and a scattered electromagnetic wave generated by an electromagnetic radiation interaction between a probe tip dipole and a workpiece dipole.

3. A method according to claim 2, wherein the sampling comprises a dipole coupling of two externally driven dipoles including respectively the probe tip and workpiece dipoles.

4. A method according to claim 3, wherein the sampling comprises a predominantly magnetic dipole coupling.

5. A method according to claim 3, wherein the sampling comprises a predominantly electric dipole coupling.

6. A method according to claim 1, wherein the encoded wave information comprises a scattered local evanescent or propagating or standing electromagnetic field.

7. A method according to claim 1, wherein step (2) comprises decoding said wave packet by employing an interferometer.

8. A method according to claim 7, comprising employing a differential Nomarski interferometer.

9. A method according to claim 1, wherein step 3 comprises correlating the phase information to the polarization of the workpiece.

10. A method according to claim 9, comprising the step of correlating the polarization to the susceptibility of the workpiece.

11. A method according to claim 10, comprising correlating the susceptibility of the workpiece to the dielectric constant of the workpiece.

12. A method according to claim 10, comprising correlating the susceptibility of the workpiece to its magnetic properties.

13. A method according to claim 1, wherein step 3 comprises correlating the amplitude information to the workpiece absorption.

14. A method according to claim 1, comprising generating a time-variable multi-pole interactive coupling by modulating at least one of the wavelength of the electromagnetic wave packet, the relative positioning of probe and workpiece, and external applied electromagnetic field to the interaction region.

* * * * *